US008898420B2

(12) United States Patent
So et al.

(10) Patent No.: US 8,898,420 B2
(45) Date of Patent: Nov. 25, 2014

(54) NON-VOLATILE STORAGE DEVICE AND A MEMORY CONTROLLER CONTROLLING PARITY TABLES OF RECORDING REGIONS OF THE NON-VOLATILE STORAGE DEVICE

(75) Inventors: Hirokazu So, Kyoto (JP); Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 13/464,194

(22) Filed: May 4, 2012

(65) Prior Publication Data

US 2012/0317341 A1     Dec. 13, 2012

(30) Foreign Application Priority Data

Jun. 8, 2011  (JP) ................................ 2011-127887
Mar. 15, 2012 (JP) ................................ 2012-058666

(51) Int. Cl.
*G06F 12/00*     (2006.01)
*G06F 11/10*     (2006.01)

(52) U.S. Cl.
CPC ........ *G06F 11/1004* (2013.01); *G60F 11/1008* (2013.01)
USPC ........... 711/170; 711/103; 711/154; 714/758; 714/800

(58) Field of Classification Search
CPC ........................ G06F 11/1004; G06F 11/1008
USPC .......................................................... 711/170
See application file for complete search history.

(56) References Cited

U.S. PATENT DOCUMENTS

| 2005/0172065 | A1* | 8/2005 | Keays | 711/103 |
| 2008/0201625 | A1* | 8/2008 | Mulligan | 714/758 |
| 2009/0157950 | A1* | 6/2009 | Selinger | 711/103 |
| 2009/0249168 | A1* | 10/2009 | Inoue | 714/763 |
| 2010/0064094 | A1* | 3/2010 | Yeh | 711/103 |

FOREIGN PATENT DOCUMENTS

| JP | 2005-292925 | 10/2005 |
| JP | 2009-301148 | 12/2009 |

* cited by examiner

*Primary Examiner* — April Y Blair
*Assistant Examiner* — Prasith Thammavong
(74) *Attorney, Agent, or Firm* — Wenderoth, Lind & Ponack, L.L.P.

(57) ABSTRACT

A non-volatile storage device, which communicates with an access device and carries out reading and/or writing of data in accordance with a command from the access device, the device comprises one or more non-volatile memories for storing data and a memory controller for carrying out control of the non-volatile memory. The memory controller writes data to the error correcting group and writes a provisional error correcting code with respect to the data to the parity table if a data size is smaller than the first size when writing the data.

4 Claims, 14 Drawing Sheets

*Fig.8*

| PROVISIONAL PARITY VALUE | VALID FLAG | IDENTIFICATION INFORMATION (e.g. ADDRESS INFORMATION) |
|---|---|---|

Fig.11

DATA RECORDING REGION 125 | PARITY TABLE REGION 126

| | D0 | D1 | D2 | D3 | P0-3 | PARITY TABLE (VALID FLAG) |
|---|---|---|---|---|---|---|
| T0 | ERASED | ERASED | ERASED | ERASED | ERASED | INVALID |
| T1 | ▨ | ERASED | ERASED | ERASED | ERASED | VALID |
| T2 | ▨ | ▨ | ERASED | ERASED | ERASED | VALID |
| T3 | ▨ | ▨ | ▨ | ERASED | ERASED | VALID |
| T4 | ▨ | ▨ | ▨ | ▨ | ▨ | INVALID | ial error correcting code with respect to the data to the parity table if a data size is smaller than the first size when writing the data.

NON-VOLATILE STORAGE DEVICE AND A MEMORY CONTROLLER CONTROLLING PARITY TABLES OF RECORDING REGIONS OF THE NON-VOLATILE STORAGE DEVICE

BACKGROUND

1. Technical Field

The present invention relates to a memory controller for controlling a non-volatile memory, and a non-volatile storage device such as a semiconductor memory card including the non-volatile memory and the memory controller.

2. Related Art

In recent years, a demand for a non-volatile storage device including a rewritable non-volatile memory is increasing, centering on a semiconductor memory card.

The semiconductor memory card has various advantages such as being small and light weight, having large capacity and resistance to quake, and being easy and convenient to handle, and hence the demand for such a semiconductor memory card is increasing as a recording medium of a portable device such as a digital still camera or a portable telephone. Recently, a slot for the semiconductor memory card is provided as a standard not only in the portable device but also in a stationary device such as a digital television and a DVD recorder, and thus the demand for the semiconductor memory card is further increasing.

The semiconductor memory card described above includes a flash memory (mainly NAND flash memory) serving as a non-volatile main storage memory, and a memory controller for controlling the same. The memory controller carries out read/write control of data with respect to the flash memory in accordance with a read/write command of data from an access device represented by a digital still camera main body, or the like.

The writing of data from the memory controller to the flash memory is carried out in units called a page. The main stream in a recent flash memory is a page size of about 4 kB (kilobyte) or 8 kB.

The flash memory includes a number of memory elements called cells, and stores information by accumulating charges in each cell or discharging charges from each cell. However, the information stored in the cell may get lost due to degradation of the cell or the like. The memory controller thus generally generates an error correcting code with respect to write data from the access device, and stores the same in the flash memory with the write data. Thus, even if an error occurs during the reading of the data, correction can be made if the number of error bits is within a correction capability of the error correcting code to be applied, so that correct data can be read. For example, Japanese Patent Publication No. 2005-292925 proposes a method of alternately storing the write data (user data) and the error correcting code (additional data) in a page of the flash memory.

In the method described above, however, correct data cannot be read if an error beyond the correction capability of the error correcting code occurs during the reading of the data.

SUMMARY

The present invention has been made in view of the above problems, and an object of the present invention is to provide a non-volatile storage device capable of correctly reading data even if an error beyond the correction capability of the error correcting code occurs during the reading of the data.

To solve the above problems, the present inventors have devised a method of further giving a second error correcting code with respect to a set of data to which an error correcting code (hereinafter referred to as first error correcting code; is given. For example, the present inventors have devised a method of giving a parity of one page with respect to the data for four pages as the second error correcting code. In this manner, even if an error beyond the correction capability of the first error correcting code occurs, correct data can be read by using the second error correcting code (parity).

However, in the method described above, the data unit managed by the memory controller becomes large if the second error correcting code is given, and hence the overhead becomes large if the data size of the data write from the access device is small and the speed of the data write lowers.

Since the parity for one page is given to the data for four pages in the previous example, the memory controller carries out management of input/output data in units of five pages. For example, even if the size of the data write from the access device is one page, the memory controller writes a total of five pages, the data for four pages and the parity for one page with respect thereto, in the flash memory. In this case, one page of the data for four pages is configured by data received from the access device, but the remaining three pages are configured by existing data read from the non-volatile memory. Therefore, the overhead in this case inevitably becomes large compared to the case in which the size of the data write from the access device is four pages.

Further, the present invention has been made in view of the above problems, and provides a non-volatile storage device and a memory controller capable of efficiently carrying out writing of data of a small data size even if the first and second error correcting codes are given in the writing of data to the non-volatile memory.

A non-volatile storage device according to the present invention relates to a non-volatile storage device, communicable with an access device, for carrying out reading and/or writing of data in accordance with a command from the access device, the non-volatile storage device including one or more non-volatile memories for storing data; and a memory controller for carrying out control of the non-volatile memory; wherein the non-volatile memory includes a plurality of blocks, which are erase units, each of the blocks including a plurality of pages, which are write units of data; and the memory controller assigns a plurality of error correcting groups each configured by the plurality of pages to one recording region of the non-volatile memory, and assigns data of a first size and an error correcting code with respect to the data of the first size to the error correcting group, further assigns a parity table to a different recording region of the non-volatile memory, and writes data to the error correcting group and writes a provisional error correcting code with respect to the data to the parity table if a data size is smaller than the first size when writing the data.

A memory controller according to the present invention relates to a memory controller for carrying out control of one or more non-volatile memories for storing data, wherein the non-volatile memory includes a plurality of blocks, which are erase units, each of the blocks including a plurality of pages, which are write units of data; and the memory controller assigns a plurality of error correcting groups each configured by the plurality of pages to one recording region of the non-volatile memory, and assigns data of a first size and an error correcting code with respect to the data of the first size to the error correcting group, further assigns a parity table to a different recording region of the non-volatile memory, and writes data to the error correcting group and writes a provisional error correcting code with respect to the data to the parity table if a data size is smaller than the first size when writing the data.

According to the present invention, the second error correcting code is given to the set of data to which the first error correcting code is given, and then stored in the non-volatile memory. Accordingly, the data can be correctly read even if an error beyond the correction capability of the first error correcting code occurs when reading data. Furthermore, according to the present invention, when writing is carried out in a size smaller than the parity group in the non-volatile storage device, only one part of the data pages configuring the parity group is updated and the provisional parity value with respect to the data of the one part of the data pages is written as the parity page in the region of the parity table. Accordingly, if the size of the data is small in the writing to the non-volatile memory, the number of pages to carry out the writing on is reduced and the data writing process can be alleviated.

BRIEF DESCRIPTION OF DRAWINGS

FIG. 8 is a diagram showing a layout example of a parity table according to the first embodiment of the present invention;

FIG. 11 is a diagram showing an example of a state during the writing process of the non-volatile storage device according to the first embodiment of the present invention.

DETAILED DESCRIPTION OF PREFERRED EMBODIMENT

Hereinafter, embodiments of the present invention will be described with reference to the drawings.

First Embodiment 1.1 Configuration of Non-Volatile Storage System

A configuration of a non-volatile storage system 1000 according to a first embodiment of the present invention will be described with reference to FIGS. 1 to 4.

Figure 1:
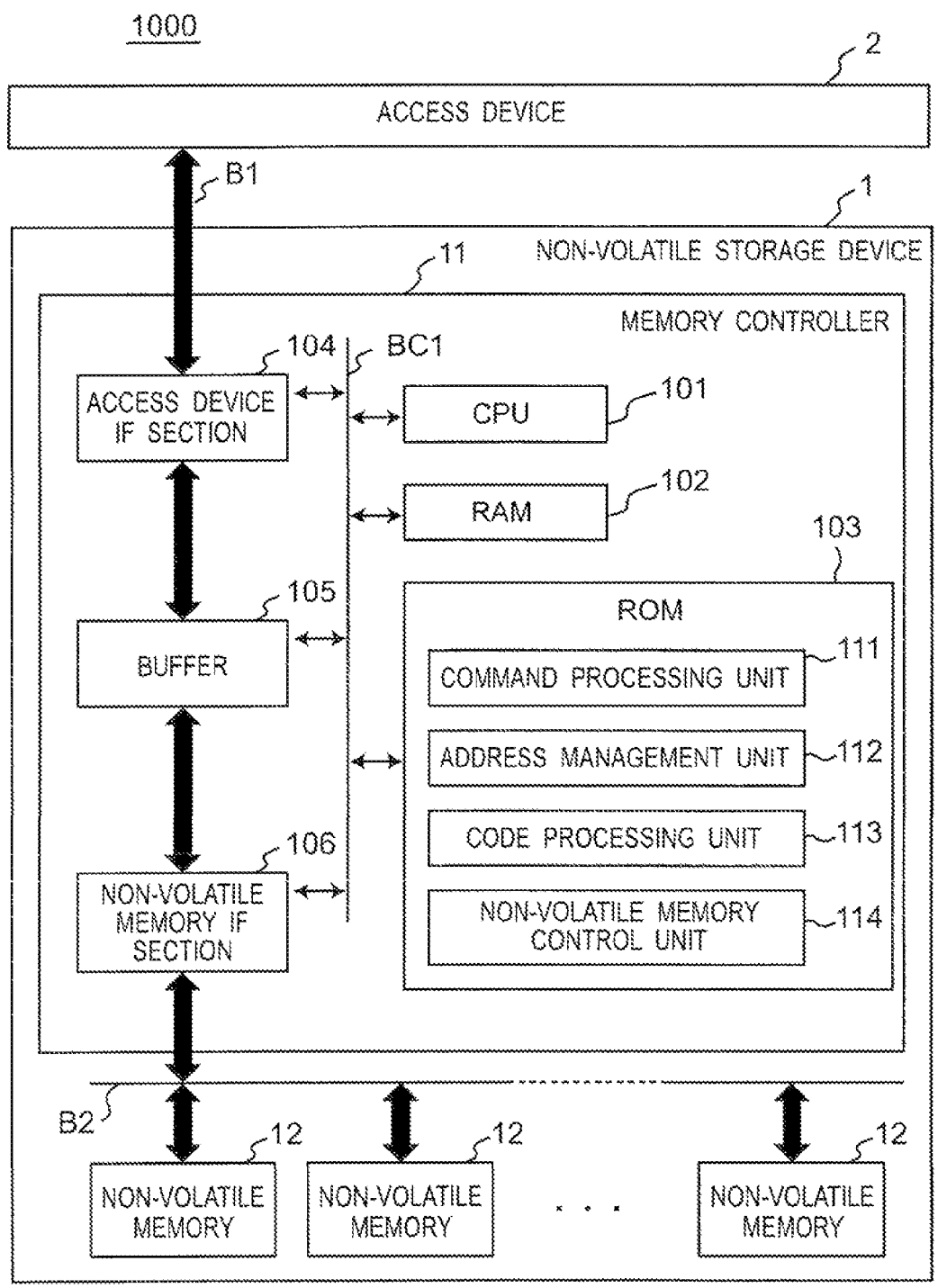
FIG. 1 is a schematic configuration diagram of a non-volatile storage system according to a first embodiment of the present invention.

FIG. 1 is a schematic configuration diagram of the non-volatile storage system 1000 according to the first embodiment of the present invention. As shown in FIG. 1, the non-volatile storage system 1000 includes a non-volatile storage device 1 and an access device 2, to which the non-volatile storage device 1 is attached. The non-volatile storage device 1 and the access device 2 are connected by a bus B1, so that communication can be carried out bi-directionally. The non-volatile storage device 1 carries out reading and/or writing of data in accordance with a command from the access device 2. In this case, the non-volatile storage device 1 is, for example, a semiconductor memory card. The access device 2 is, for example, a digital still camera for recording a still image content in a semiconductor memory card.

As shown in FIG. 1, the non-volatile storage device 1 includes a memory controller 11, and one or more non-volatile memories 12 for storing data. The memory controller 11 and the non-volatile memory 12 are connected by a bus B2. The memory controller 11 transmits and receives data, that is, carries out reading/writing of data as well as transmission of a command and reception of a response with the non-volatile memory 12 via the bus B2 to control the non-volatile memory 12. If a plurality of non-volatile memories 12 are provided, a plurality of bus B2 may be provided.

The memory controller 11 is a module that carries out the entire control of the non-volatile storage device 1, and is configured, for example, as an LSI (Large Scale Integration) including a CPU and the like. The non-volatile memory 12 is, for example, a NAND flash memory.

As shown in FIG. 1, the memory controller 11 includes a CPU 101, RAM 102, a ROM 103, an access device IF (interface) section 104, a buffer 105, and a non-volatile memory IF (interface) section 106. As shown in FIG. 1, each function section of the memory controller 11 is connected via a bus BC1. The memory controller 11 may have a configuration in which all or part of the function sections of the memory controller 11 is directly connected.

The access device IF section 104 is a connecting section of the non-volatile storage device 1 and the access device 2. The transmission and reception of control signals and data of the access device 2 and the non-volatile storage device 1 are carried out through the access device IF section 104.

The non-volatile memory IF section 106 is a connecting section of the memory controller 11 and the non-volatile memory 12. The transmission and reception of control signals and data of the memory controller 11 and the non-volatile memory 12 are carried out through the non-volatile memory IF section 106.

The buffer 105 is a memory for temporarily storing data received from the access device 2 via the access device IF section 104, data transmitted (output) to the access device 2 via the access device IF section 104, data read from the non-volatile memory 12 via the non-volatile memory IF section 106, data to write to the non-volatile memory 12 via the non-volatile memory IF section 106, and the like.

The ROM 103 stores a program for controlling the non-volatile storage device 1. This program is loaded to the RAM 102 and then executed by the CPU 101.

Specifically, as shown in FIG. 1, the ROM 103 includes a command processing unit 111, an address management unit 112, a code processing unit 113, and a non-volatile memory control unit 114. In the present embodiment, the command processing unit 111, the address management unit 112, the code processing unit 113, and the non-volatile memory control unit 114 are assumed to be implemented by software on the ROM 103, but the present invention is not limited thereto, and all or part of the command processing unit 111, the address management unit 112, the code processing unit 113, and the non-volatile memory control unit 114 may be implemented by hardware.

The command processing unit 111 is a function unit for interpreting the command and the parameter related to the command received from the access device 2 via the access device IF section 104, and executing the process of the command.

The address management unit 112 carries out the overall address management of the non-volatile memory 12, but valid data is not stored in the address management unit 112 itself. First, the address management unit 112 manages a physical address of a logical-physical conversion table in which a logical address in a logical address space provided by the non-volatile storage device 1 as an address space accessible from the access device 2, and a physical address in the non-volatile memory 12 are associated. The address management unit 112 also manages the physical address of a free block, which is a block reusable for data write, the physical address of a defective block non-usable for data write, the physical address of a block stored with a conversion table of a logical address and a physical address, and the like.

The code processing unit 113 carries out processing of the first and second error correcting codes with respect to the data read or written with respect the non-volatile memory 12. The error correcting code herein is, for example, a Reed Solomon code or parity.

The code processing unit 113 generates the first error correcting code with respect to the data at the time of writing data to the non-volatile memory 12. Furthermore, the code processing unit 113 generates the second error correcting code with respect to the data and the first correcting code of the relevant data. The data, the first error correcting code, and the second error correcting code are then written to the non-volatile memory 12.

Further, the code processing unit 113 reads the first error correcting code with the data when reading data from the non-volatile memory 12, and carries out detection and correction of error of the read data. If an error in which correction cannot be made by the first error correcting code is detected, the second error correcting code is further read from the non-volatile memory 12, and the detection and correction of the error are carried out.

The non-volatile memory control unit 114 is a device driver for processing a control signal transmitted and received via the non-volatile memory IF section 106.

Figure 2:
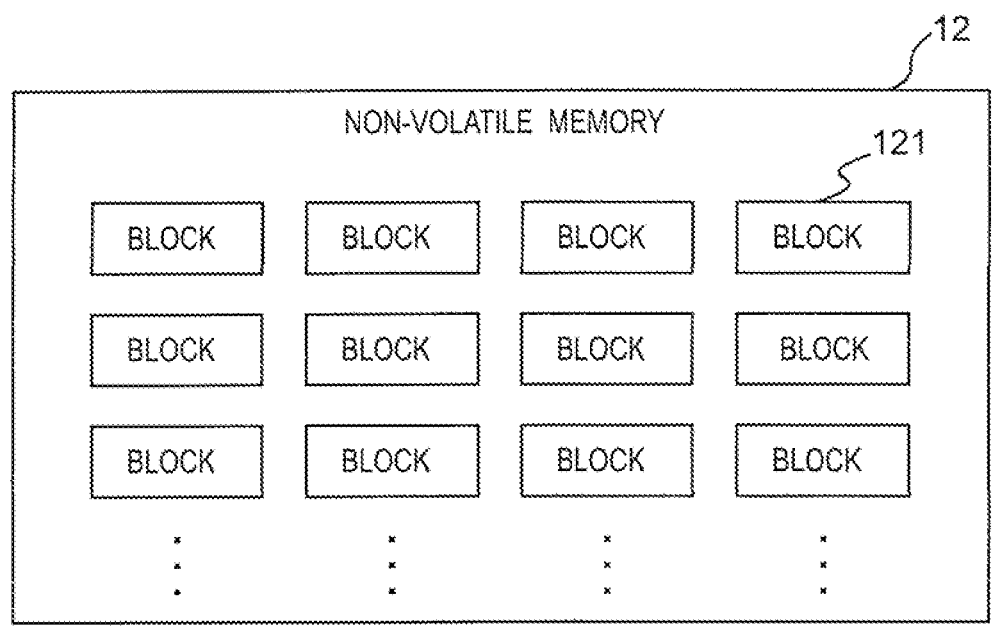
FIG. 2 is a diagram showing a configuration example of a non-volatile memory according to the first embodiment of the present invention.

FIG. 2 is a diagram showing a configuration example of the non-volatile memory 12 according to the present embodiment. The non-volatile memory 12 includes a plurality of blocks (physical blocks) 121, which are erase units of data. The size of each block 121 is about 1 MB (megabyte).

Figure 3:
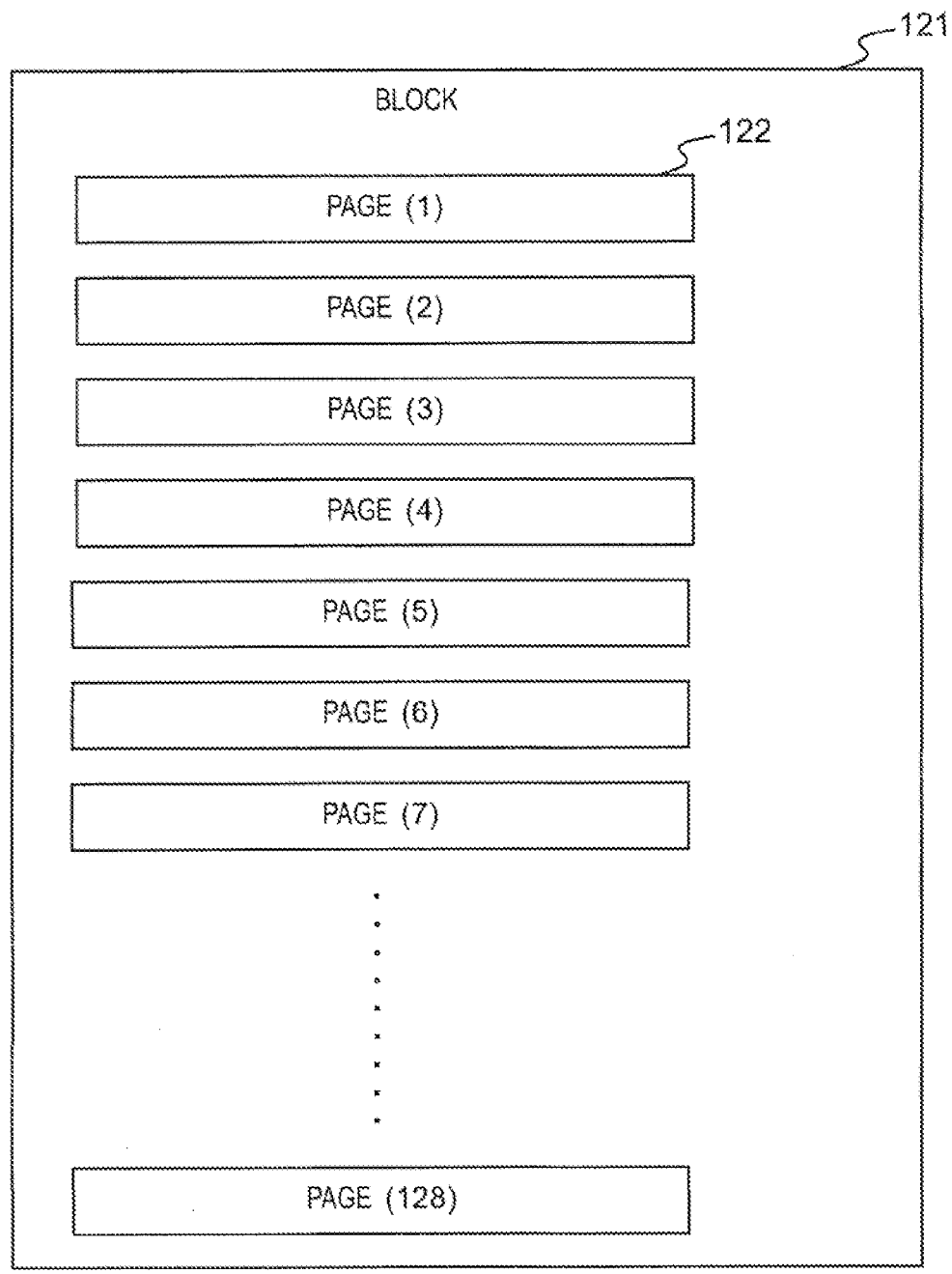
FIG. 3 is a diagram showing a configuration example of a block shown in FIG. 2.

FIG. 3 is a diagram showing a configuration example of the block 121 shown in FIG. 2. The block 121 includes a plurality of pages 122, which are write units of data. The size of each page 122 is about 8 kB, for example. The number of pages per one block 121 is, for example, 128 pages.

Figure 4:
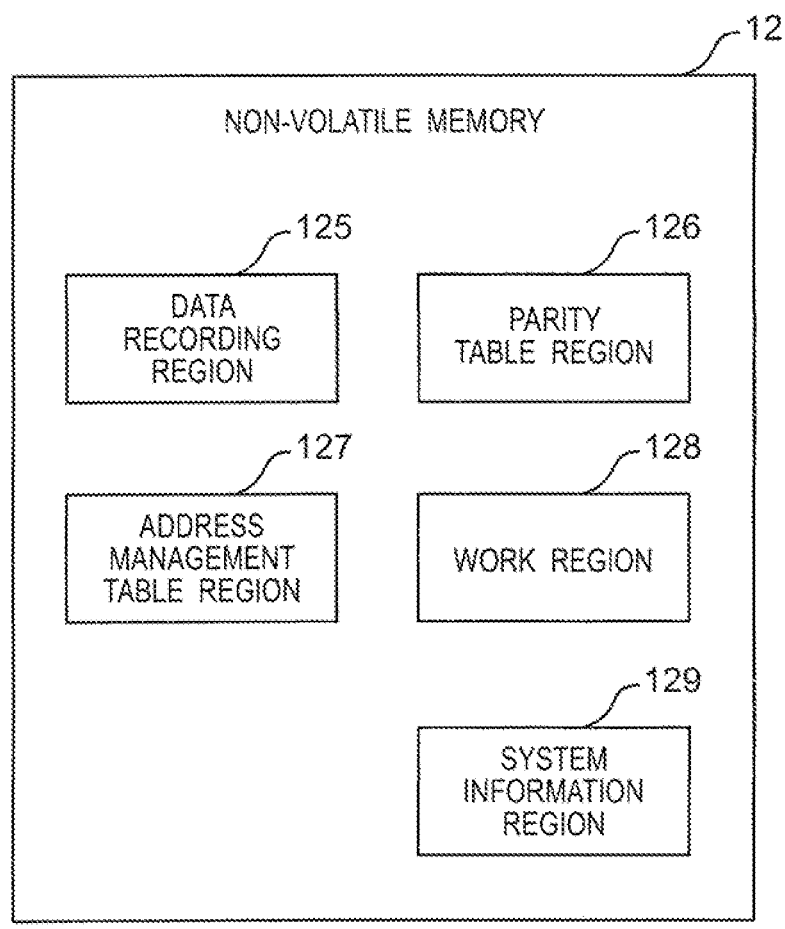
FIG. 4 is a diagram showing regions set in the non-volatile memory according to the first embodiment of the present invention.

FIG. 4 is a diagram showing a region set in the non-volatile memory 12 according to the present embodiment. The region in the non-volatile memory 12 herein is divided based on the type of information stored in the non-volatile memory 12. The regions set in the non-volatile memory 12 include a data recording region 125, a parity table region 126, an address management table region 127, a work region 128, a system information region 129, and the like.

The data recording region 125 is a region for storing the write data from the access device 2. The first and second error correcting codes with respect to the data are also stored in addition to the data from the access device 2.

As will be described later, the parity table region 126 is a region (see FIG. 9) for storing a parity table (see FIG. 8, FIG. 11) for recording a provisional value of the second error correcting code (parity) with respect to the write data from the access device 2 to be stored in the data recording region 125.

The address management table region 127 is a region for storing various types of table information required for the address management unit 112 to carry out address management. The various types of table information include a logical-physical conversion table of the logical address and the physical address, the address table of the free blocks, and the like.

The work region 128 is a region configured by free blocks and not stored with valid data.

The system information region 129 is a region for storing system information internally used by the memory controller 11. Furthermore, the first and second error correcting codes with respect to the system information are also stored.

1.2 Arrangement of Error Correcting Code

Next, the arrangement of the first and second error correcting codes when the memory controller 11 stores the data in the non-volatile memory 12 will be described with reference to FIGS. 5 to 9.

Figure 5:
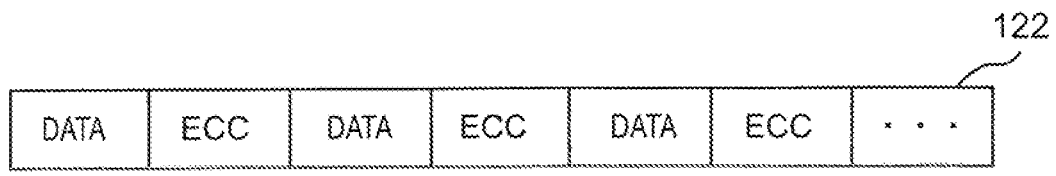
FIG. 5 is a diagram showing one example of a configuration of a data page according to the first embodiment of the present invention.

FIG. 5 is a diagram showing one example of a configuration of a page storing the data (hereinafter referred to as data page) according to the present embodiment. In the data page, the data and the first error correcting code with respect to the relevant data are arranged in the page. In FIG. 5, the first error correcting code is described as "ECC".

As shown in FIG. 5, when giving the first error correcting code in a divided manner with respect to the data stored in the page, the data and the first error correcting code are alternately arranged with the divided data and the first error correcting code with respect to the divided data as a set.

When reading the data from the non-volatile memory 12, the first error correcting code with respect to the data is always read with the data, and thus the overhead of a control signal at the time of reading (e.g., address specification or the like) can be reduced by continuously arranging them in the same page.

Figure 6:
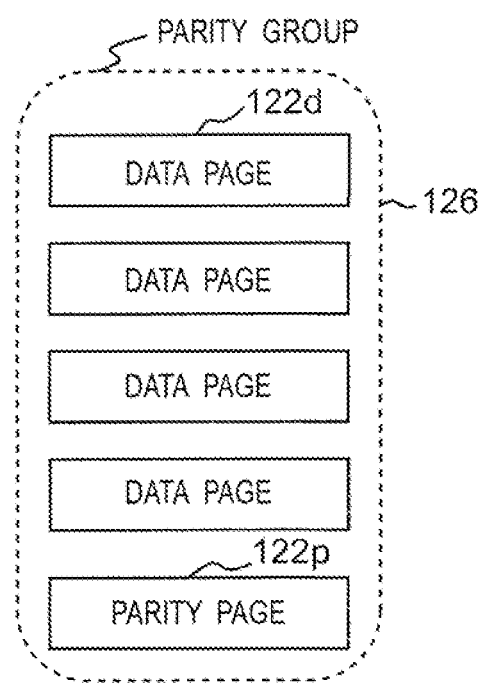
FIG. 6 is a diagram showing an example of a parity group according to the first embodiment of the present invention.

FIG. 6 is a diagram showing an example in which the second error correcting code is given to one or more data pages, according to the present embodiment. In the present embodiment, parity is used for the second error correcting code, and a page storing the second error correcting code is referred to as a parity page. Hereinafter, a combination of one or more data pages and the parity page with respect to such data pages is referred to as "parity group".

The error correcting code other than the parity (e.g., Reed Solomon code) may be used as the second error correcting code. In this case, the parity group may be more generally referred to as an error correcting group.

In the example shown in FIG. 6, one parity page is given with respect to four data pages to configure one parity group. In the parity page, for example, the value of XOR (exclusive OR) of the data stored in each data page is stored. Furthermore, the first error correcting code with respect to the value of the XOR is stored.

In the example shown in FIG. 6, the ratio of the data page and the parity page is 4 to 1, but other arbitrary ratios may be applied. The capacity of data that can be stored in the non-volatile memory 12 increases as the ratio of the data page becomes greater. The error correction capability with respect to the data page increases as the ratio of the parity page becomes greater.

Figure 7:
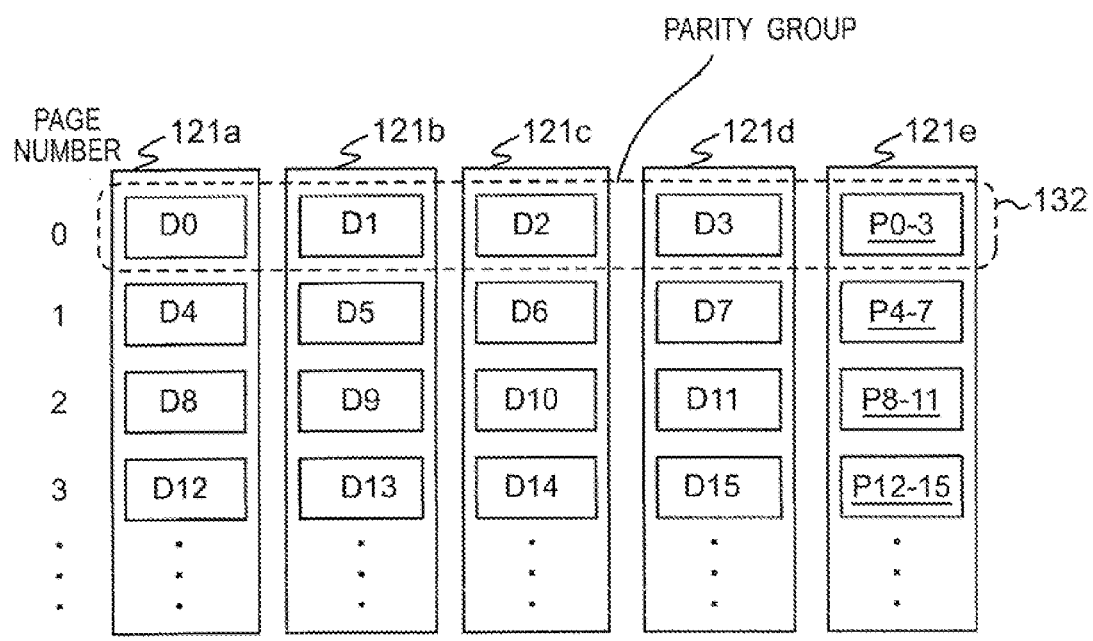
FIG. 7 is a diagram showing one example of an arrangement of the parity group according to the first embodiment of the present invention.

FIG. 7 is a diagram showing one example of an arrangement of a parity group according to the present embodiment. The arrangement shown in FIG. 7 is applied to the data recording region 125, which are regions for storing the parity (second error correcting code), and the system information region 129.

In FIG. 7, D0, D1, . . . , D15 represent the data page, P0-3 represents the parity page with respect to the data pages D0 to D3, P4-7 represents the parity page with respect to the data pages D4 to D7, P8-11 represents the parity page with respect to the data pages D8 to D11, P12-15 represents the parity page with respect to the data pages D12 to D15.

Each parity group is arranged over five blocks 121a, 121b, 121c, 121d, 121e. Thus, the reading and writing of data to each parity group become parallel access to different physical blocks and can be carried out at high speed. Similarly, the reading and writing of successive parity groups can be carried out at high speed.

The address management process in the address management unit 112 can be simplified by configuring and arranging the parity group such that the parity group is not arranged over a plurality of logical blocks. In the example of FIG. 7 showing the arrangement of the parity group, the management in the address management unit 112 can be simplified by managing the five physical blocks 121a, 121b, 121c, 121d, 121e as one logical block.

FIG. 8 is a diagram showing a configuration example of a parity table according to the present embodiment. One record of the parity table includes a parity value (provisional parity value) with respect to the data of the data page of one part configuring the parity group, a valid flag for determining valid/invalid of the provisional parity value, and identification information of the provisional parity value. The identification information of the provisional parity value includes address information such as the address of the logical block and the address of the parity group related to the target data of the provisional parity value.

Figure 9:
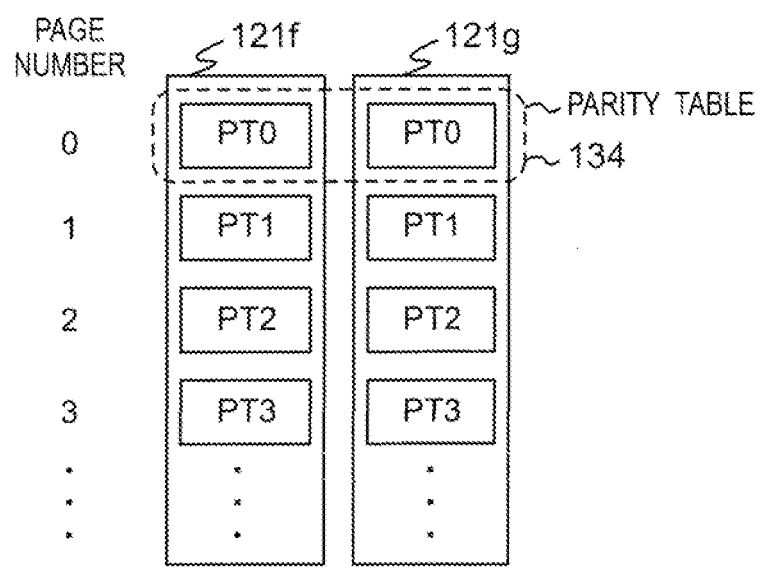
FIG. 9 is a diagram showing one example of an arrangement of the parity table according to the first embodiment of the present invention.

FIG. 9 is a diagram showing one example of the arrangement of the parity table according to the present embodiment. The arrangement shown in FIG. 9 is applied to the parity table region 126, which is the region for storing the parity table.

In FIG. 9, PT0, PT1, PT2, PT3, . . . represent the parity table. The parity table is written in order from the head page in units of two pages, and the records other than the record of the parity table written most recently are made invalid regardless of the value of the valid flag. Thus, the update of the parity table is basically completed with the writing of two pages.

Each parity table is arranged over two blocks 121f, 121g. Thus, the reading and writing of each parity table can be carried out at high speed by the parallel access to different blocks.

Only when the writing is carried out to the last page of the two blocks 121f, 121g, two free blocks are ensured as a new parity table region 126 from the work region 128, the physical erasing of such blocks is carried out, and then, a new parity table is written in units of two pages in order from the head page. On the other hand, the two blocks 121f, 121g in which the writing has been carried out to the last page and only the invalid parity table exists become the free blocks of the work region 128.

1.3 Operation of Non-Volatile Storage System

Next, the operation of the non-volatile storage system 1000 will be described with reference to FIGS. 10 to 13.

The non-volatile storage device 1 is attached to the access device 2, and performs the process corresponding to the command issued by the access device 2. The access device 2 issues a command (e.g., write command or read command) necessary for recording and reproduction of still image data, moving image data, and the like to the non-volatile storage device 1, and carries out transmission and reception of the data.

1.3.1 (1) Writing Process

Figure 10:
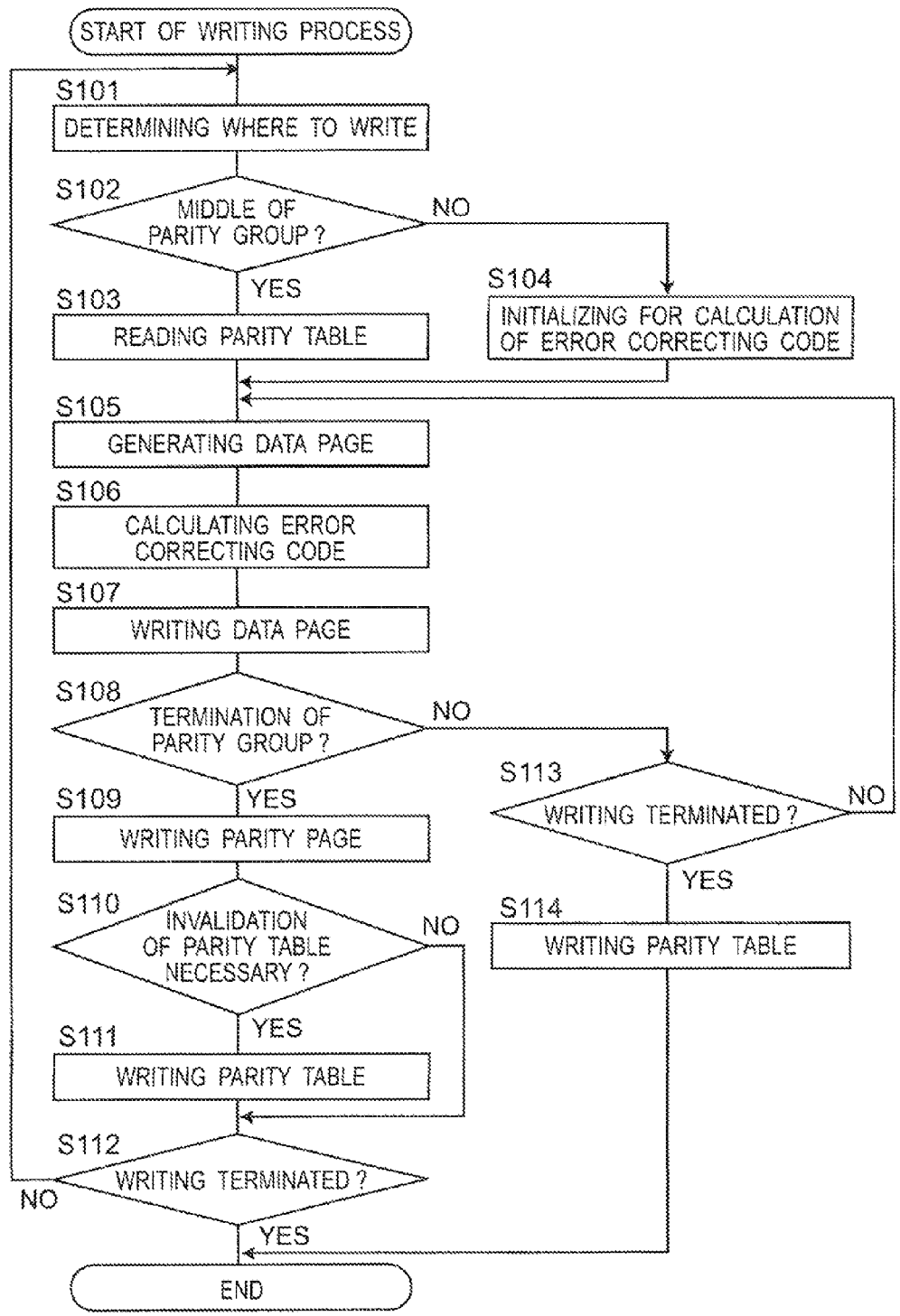
FIG. 10 is a flowchart showing a procedure of a writing process of a non-volatile storage device according to the first embodiment of the present invention.

The access device 2 issues the write command to the non-volatile storage device 1 and transfers the write data so that the writing process is carried out in the non-volatile storage device 1. FIG. 10 is a flowchart showing a procedure of the writing process of the non-volatile storage device 1 according to the first embodiment of the present invention.

First, the process in step S101 will be described. In the non-volatile storage device 1, upon receiving the write command from the access device 2 through the access device IF section 104, the command processing unit 111 acquires parameters such as write address and size associated with the write command. From these parameters, the command processing unit 111 specifies the logical address of the parity group to carry out the writing of, and notifies such information to the address management unit 112.

The address management unit 112 determines a physical write destination in the non-volatile memory 12 by referencing the information acquired from the command processing unit 111, the information of the conversion table of the logical address and the physical address, the address information of the free block, and the information of a table managing the write state to the block (i.e., state related to data of what logical address is written up to which page in which block).

Next, the process in step S102 will be described. If the write destination determined by the address management unit 112 in the process of step S101 is not the boundary of the parity group, but is the middle of the parity group, the process proceeds to the process of step S103. If it is the boundary of the parity group, that is, the head of the parity group, the process proceeds to the process of step S104.

Next, the process in step S103 will be described. The command processing unit 111 instructs the preparation for the writing to the code processing unit 113. The code processing unit 113 ensures a region for the calculation of the second error correcting code in the buffer 105. The parity table is then read from the parity table region 126 of the non-volatile memory 12 by the non-volatile memory control unit 114, and the provisional parity value contained in the read parity table is stored in the region for the calculation of the second error correcting code ensured in the buffer 105.

Next, the process in step S104 will be described. The command processing unit 111 instructs the code processing unit 113 to prepare for the writing. The code processing unit 113 ensures a region for calculation of the second error correcting code in the buffer 105, and sets a value of this region as an initial value.

Next, the process in step S105 will be described. The command processing unit 111 stores the write data from the access device 2 to the buffer 105 through the access device IF section 104. The code processing unit 113 generates the first error correcting code with respect to the write data. The information of the data page including the write data and the first error correcting code thereof is generated in the buffer 105. In generating the information of the data page, if the write data received from the access device 2 is not sufficient for it (e.g., when the access device 2 instructs writing from the address in the middle of the parity group or data page), the address management unit 112 is referenced to read the existing data of the non-volatile storage device 1 and generate the first error correcting code with respect thereto. The insufficiency in information of the data page is compensated by the existing data and the first error correcting code with respect thereto.

Next, the process in step S106 will be described. The code processing unit 113 references the value set in the region for calculation of the second error correcting code ensured in step S103 or step S104 and the information of the data page generated in step S105 to carry out the calculation of the second error correcting code (e.g., XOR (exclusive OR) calculation), and rewrites the result to the region for calculation of the second error correcting code ensured in step S103 or step S104.

Next, the process in step S107 will be described. The non-volatile memory control unit 114 writes the information of the data page generated in step S105 to the physical write destination determined in step S101 through the non-volatile memory IF section 106.

Next, the process in step S108 will be described. If the data page written in immediately previous step S107 is the termination of the parity group, the process proceeds to the process of step S109. If not, the process proceeds to the process of step S113.

Next, the process in step S109 will be described. The code processing unit 113 generates the first error correcting code with respect to the parity, with the calculation result of the second error correcting code generated in step S106 as the parity. The non-volatile memory control unit 114 writes the parity and the first error correcting code thereof as the parity page in the physical write destination determined in step S101 through the non-volatile memory IF section 106.

Next, the process in step S110 will be described. The code processing unit 113 determines whether or not invalidation of the parity table is necessary. If the writing process has been carried out through step S103, determination is made that the invalidation of the parity table is necessary, and the process proceeds to the process of step S111. If the writing process has been carried out through step S104, determination is made that the invalidation of the parity table is unnecessary, and the process proceeds to the process of step S112.

Next, the process in step S111 will be described. The code processing unit 113 generates information of the parity table in which the valid flag is set to "invalid". A dummy value is set in the provisional parity value and the identification information. The non-volatile memory control unit 114 writes the generated value (record) of the parity table in the parity table region 126.

Next, the process in step S112 will be described. If all the write data from the access device 2 is written, the writing process is terminated. If not, the process returns to the process of step S101, and as for the write data from the access device 2, the writing of data for which writing is not yet carried out is continued.

Next, the process in step S113 will be described. If all the write data from the access device 2 is written, the process proceeds to the process of step S114. If not, the process returns to the process of step S105, and the writing of the next data page in the parity group is continued.

Next, the process in step S114 will be described. The code processing unit 113 generates information of the parity table having the calculation result of the second error correcting code generated in step S106 as the provisional parity value. The code processing unit 113 sets the valid flag to "valid", and sets the address information and the like related to the data page written in the process of immediately previous step S107 to the identification information. The non-volatile memory control unit 114 writes the value of the generated parity table in the parity table region 126, and the command processing unit 111 terminates the writing process.

The writing to the non-volatile memory 12 in step S107, step S109, step S111, and step S114 is desirably carried out at high speed by the parallel process of a plurality of blocks. In this case, the process proceeds to the process of the next step immediately after the writing of the data page and the parity page is started.

1.3.1 (2) States of Non-Volatile Storage Device During Writing Process

FIG. 11 is a diagram showing an example of states during the writing process of the non-volatile storage device 1 according to the first embodiment of the present invention.

With reference to FIG. 11, there will be described states of the non-volatile storage device 1 when the access device 2 divides the writing of data (D0, D1, D2, D3) for four pages configuring the parity group to four times in units of one page, and carries out the same in order.

In FIG. 11, T0 shows the state before the start of the writing by the access device 2. The parity group including the data page (D0, D1, D2, D3) in the data recording region 125 are all in a non-written (erased) state, and the valid flag in the record of the parity table written most recently in the parity table region 126 is "invalid".

When the access device 2 carries out the writing of the data page D0 in such a state, the processes of steps S101, S102, S104, S105, S106, S107, S108, S113, S114 in the flowchart shown in FIG. 10 are carried out in order in the non-volatile storage device 1, and the writing process is terminated. At this time point, a state shown with T1 of FIG. 11 is obtained. In other words, the data written by the access device 2 is stored in the data page D0 of the parity group in the data recording region 125, and the provisional parity value with respect to the data page D0 is stored in a new record of the parity table of the parity table region 126. The valid flag in the relevant record of the parity table is "valid".

When the access device 2 continuously carries out the writing of the data page D1, the processes of steps S101, S102, S103, S105, S106, S107, S108, S113, S114 in the flowchart shown in FIG. 10 are carried out in order in the non-volatile storage device 1, and the writing process is terminated. At this time point, a state shown with T2 of FIG. 11 is obtained. In other words, the data written by the access device 2 is stored in the data page D1 of the parity group in the data recording region 125, and the provisional parity value with respect to the data pages D0 and D1 is stored in a new record of the parity table of the parity table region 126. The valid flag in the relevant record of the parity table is "valid".

Subsequently, when the access device 2 carries out the writing of the data page D2, the processes of steps S101, S102, S103, S105, S106, S107, S108, S113, S114 in the flowchart shown in FIG. 10 are carried out in order in the non-volatile storage device 1, and the writing process is terminated. At this time point, a state shown with T3 of FIG. 11 is obtained. In other words, the data written by the access device 2 is stored in the data page D2 of the parity group in the data recording region 125, and the provisional parity value with respect to the data pages D0, D1, and D2 is stored in a new record of the parity table of the parity table region 126. The valid flag in the relevant record of the parity table is "valid".

Subsequently, when the access device 2 carries out the writing of the data page D3, the processes of steps S101, S102, S103, S105, S106, S107, S108, S109, S110, S111, S112 in the flowchart shown in FIG. 10 are carried out in order in the non-volatile storage device 1, and the writing process is terminated. At this time point, a state shown with T4 of FIG. 11 is obtained. In other words, the data written by the access device 2 is stored in the data page D3 of the parity group in the data recording region 125, and the final parity with respect to the data pages D0, D1, D2, and D3 is stored in the parity page P0-3. Here, the valid flag of the record of the parity table Written most recently in the parity table region 126 is "invalid". This is because the parity values of the data pages D0, D1, D2, D3 are stored in the parity page P0-3.

As described above, in the writing process of one page in the access device 2, the writing of a total of three pages, the data page for one page and the parity table for two pages, is carried out in the non-volatile storage device 1 according to the present embodiment. Since this is less than the number of write pages (five pages) required for updating the entire parity group, efficient writing is enabled.

In particular, the difference in efficiency is evident if the writing is continuously carried out in units of pages, which is described with reference to FIG. 11. That is, if the entire parity group is updated for every data page, the writing of the entire parity group (D0, D1, D2, D3, P0-3) is carried out upon receiving the first data page (D0), and the page corresponding to D1 is already written when the next data page (D1) is received and it cannot be overwritten due to the properties of the flash memory. Thus, after newly ensuring some of free blocks and carrying out physical erasure, a process of moving the existing data in units of blocks will be necessary.

1.3.2 Reading Process

Figure 12:
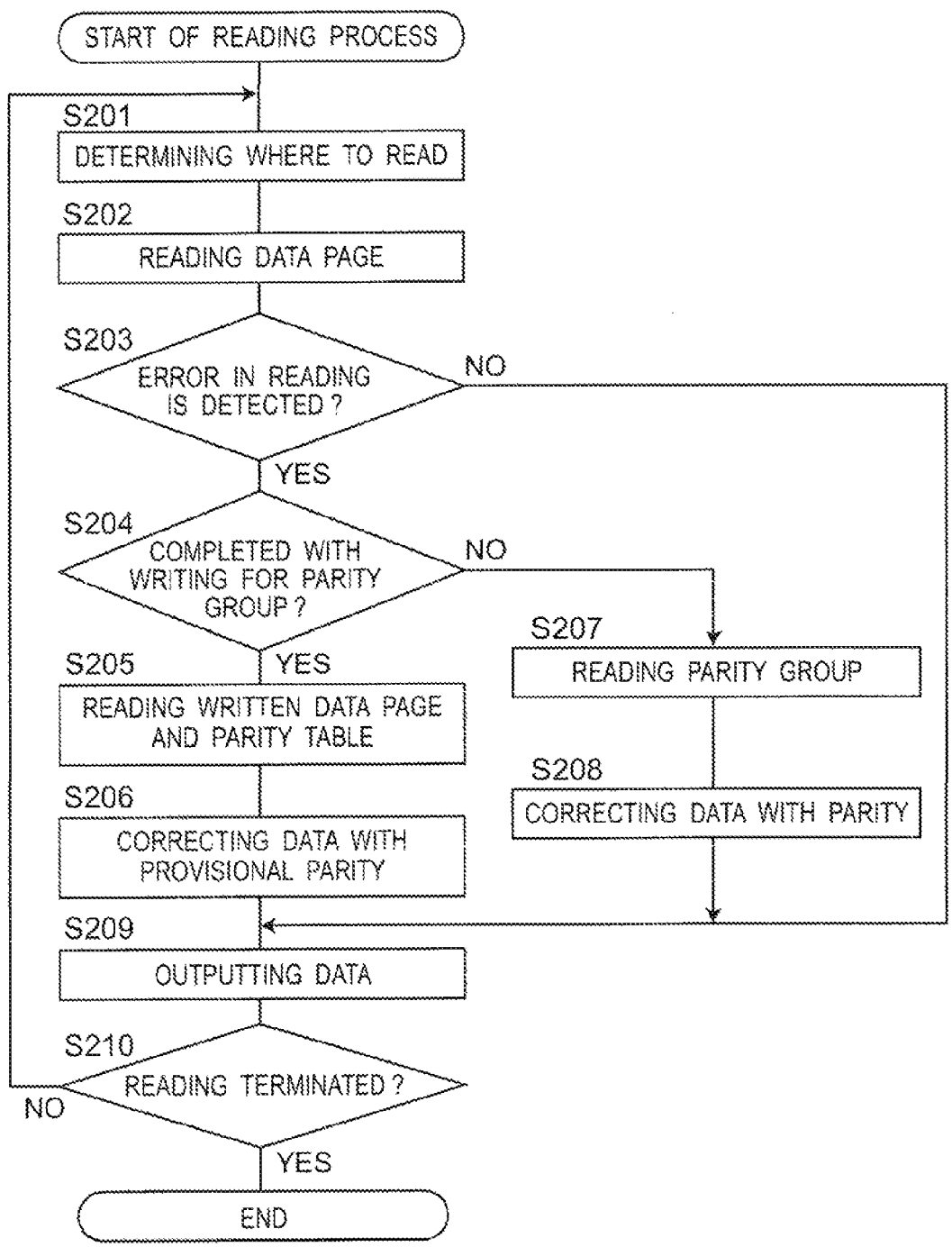
FIG. 12 is a flowchart showing a procedure of a reading process of the non-volatile storage device according to the first embodiment of the present invention.

The reading process is carried out in the non-volatile storage device 1 when the access device 2 issues a read command to the non-volatile storage device 1. The read data is sequentially transferred from the non-volatile storage device 1 to the access device 2. FIG. 12 is a flowchart showing a procedure of the reading process of the non-volatile storage device 1 according to the first embodiment of the present invention.

First, the process in step S201 will be described. In the non-volatile storage device 1, upon receiving the read command from the access device 2 through the access device IF section 104, the command processing unit 111 acquires parameters such as read address and size associated with the read command. From these parameters, the command processing unit 111 specifies the logical address of the parity group to be read, and notifies the information to the address management unit 112. The address management unit 112 determines the physical read destination in the non-volatile memory 12 by referencing the information acquired from the command processing unit 111, the information of the conversion table of the logical address and the physical address, the address information of the free block, and the information of a table managing the write state to the block (i.e., state related to data of what logical address is written up to which page in which block).

Next, the process in step S202 will be described. The non-volatile memory control unit 114 carries out the reading of the information of the data page from the physical read destination determined in step S201 through the non-volatile memory IF section 106. The information of the read data page (i.e., data and first error correcting code with respect to data) is stored in the buffer 105.

Next, the process in step S203 will be described. The code processing unit 113 carries out error detection and correction of the data using the first error correcting code stored in the buffer 105 in step S202. If an error that cannot be corrected with the correction capability based on the first error correcting code is detected, the process proceeds to the process of step S204. In other cases, the error correction is carried out using the first error correcting code, the information after the error correction is overwritten on the data in the buffer 105, and the process proceeds to the process of step S209.

If the information of the data page read in step S202 includes information other than the read address specified by the access device 2 (e.g., when access device instructs reading from address in the middle of data page), the calculation of the first error correcting code with respect to the portion other than the read address may be omitted.

Next, the process in step S204 will be described. Based on information of the read destination determined by the address management unit 112 in the process of step S201, determination is made whether or not the parity group to which the data page in which the read error occurred in step S203 belongs is completed with writing for the parity group. If the writing for the parity group is not completed (i.e., if valid provisional parity value related to parity group is stored in parity table), the process proceeds to step S205. If the writing for the parity group is completed, the process proceeds to step S207.

Next, the process in step S205 will be described. The non-volatile memory control unit 114 carries out the reading of the written data page, among the information of the parity group to which the data page in which the reading is carried out in step S202 belongs, from the physical read destination determined in step S201 through the non-volatile memory IF section 106. Since the first error correcting code is given to the read data page, the code processing unit 113 stores the data in the buffer 105 after carrying out error correction of the data using the first error correcting code. Furthermore, the non-volatile memory control unit 114 reads out the parity table of the parity table region 126. The code processing unit 113 acquires the value of the provisional parity from the parity table and stores the provisional parity in the buffer 105.

Next, the process in step S206 will be described. The code processing unit 113 carries out the error detection and correction of the data using the information of the data and the parity (second error correcting code) stored in the buffer in step S205. If an error that cannot be corrected with the correction capability based on the second error correcting code is detected, the error process (not shown) is carried out, and the reading process is terminated. Otherwise, the error correction is carried out using the second error correcting code, the information after the error correction is overwritten on the data in the buffer 105, and the process proceeds to the process of step S209.

For example, if the XOR (exclusive OR) calculation is applied for the calculation of the second error correcting code, the XOR calculation of the data for which the reading is carried out in step S205 and the parity is carried out. Accordingly, the data of the data page for which the reading is carried out in step S202 is restored.

Next, the process in step S207 will be described. The non-volatile memory control unit 114 carries out the reading of the information of the parity group, to which the data page in which the reading is carried out in step S202 belongs, from the physical read destination determined in step S201 through the non-volatile memory IF section 106. Since the first error correcting code is given to the information of the read parity group (i.e., data page other than data page for which reading is carried out in step S202, and parity page), the code processing unit 113 stores the data and the parity in the buffer 105 after carrying out error correction of the data using the first error correcting code.

Next, the process in step S208 will be described. The code processing unit 113 carries out the error detection and the correction of the data using the information of the data page and the parity page (second error correcting code) stored in the buffer in step S207. If an error that cannot be corrected with the correction capability based on the second error correcting code is detected, the error process (not shown) is carried out, and the reading process is terminated. Otherwise, the error correction is carried out using the second error correcting code, the information after the error correction is overwritten on the data in the buffer 105, and the process proceeds to the process of step S209.

For example, if the XOR (exclusive OR) calculation is applied as the calculation of the second error correcting code, the XOR calculation of data of the data page other than the data page for which the reading is carried out in step S202 and data of the parity of the parity page is carried out. Accordingly, the data of the data page for which the reading is carried out in step S202 can be restored.

Next, the process in step S209 will be described. The command processing unit 111 transmits the data (after error correction process) stored in the buffer 105 to the access device 2 as read data.

Next, the process in step S210 will be described. If all the read data specified by the access device 2 is transmitted, the reading process is terminated. If not, the process returns to the process of step S201, and as for the data to the access device 2, the reading of non-transmitted read data is continued.

The reading from the non-volatile memory 12 in step S202, step S205, and step S207 is desirably carried out at high speed by the parallel process for a plurality of blocks. In this case, the process may proceed to the process of the next step immediately after the reading of the data page and the parity page is started.

1.3.3 Initialization Process

Figure 13:
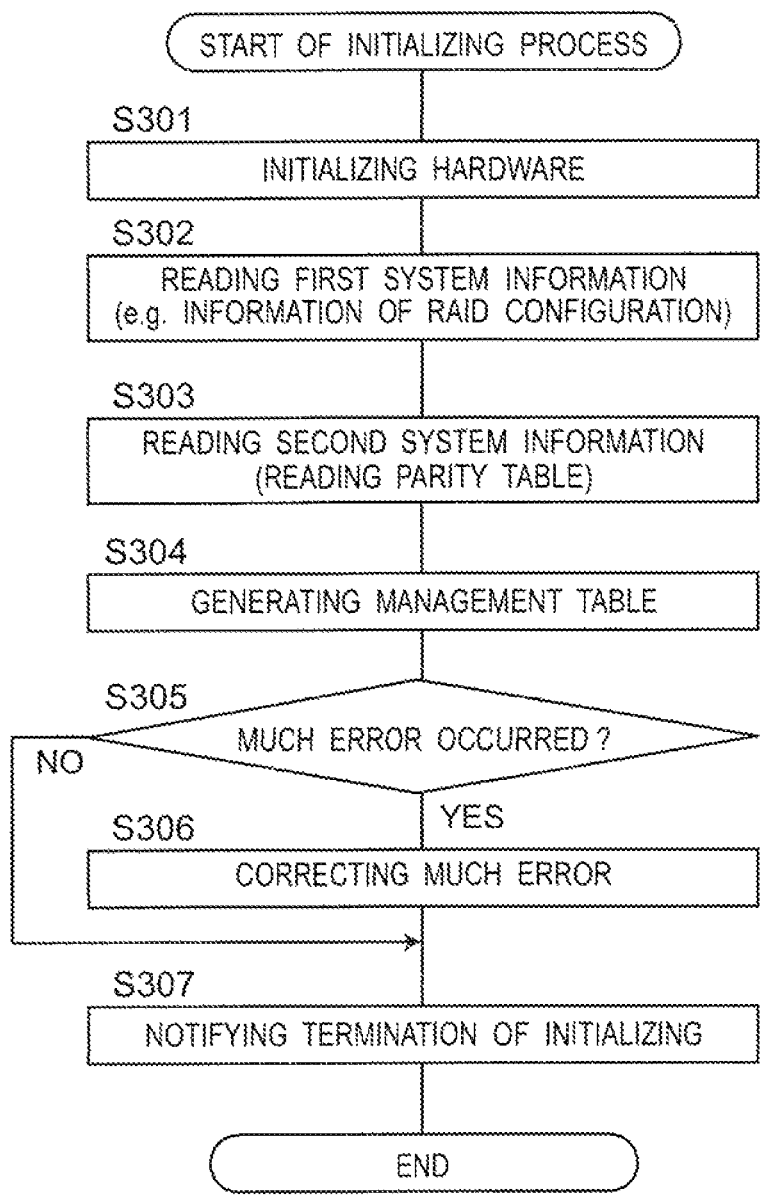
FIG. 13 is a flowchart showing a procedure of an initialization process of the non-volatile storage device according to the first embodiment of the present invention.

After the non-volatile storage device 1 is attached to the access device 2, and the power supply from the access device 2 to the non-volatile storage device 1 is started, the access device 2 issues an initialization command to the non-volatile storage device 1 to enable the reading and writing of data between the access device 2 and the non-volatile storage device 1. FIG. 13 is a flowchart showing a procedure of an initialization process of the non-volatile storage device 1 according to the first embodiment of the present invention.

First, the process in step S301 will be described. In the non-volatile storage device 1, upon receiving an initialization command from the access device 2 through the access device IF section 104, the command processing unit 111 carries out an initialization setting of the hardware of the memory controller 11. The connection check of the non-volatile memory 12 connected to the non-volatile memory IF section 106 and the like is also carried out.

Next, the process in step S302 will be described. The non-volatile memory control unit 114 reads first system information from a predetermined read destination of the non-volatile memory 12 through the non-volatile memory IF section 106. The first system information is information previously written in the non-volatile memory 12 at the time of the manufacturing of the non-volatile storage device 1, and includes various types of control information in the non-volatile storage device 1. The first system information may be the type and number of the non-volatile memory 12 connected to the memory controller 11, the configuring information of the parity group, the type and correction capability of the first and second error correcting codes, the information related to a physical storage position of the second system information (to be described later), and the information related to the address of the initial defective block. When an error occurs in the reading of the first system information, the error correction by the first and/or second error correcting code is carried out.

The address management unit 112, the code processing unit 113, and the non-volatile memory control unit 114 carry out an internal initialization process according to the content of the read first system information.

Next, the process in step S303 will be described. The non-volatile memory control unit 114 reads the second system information from a predetermined read destination of the non-volatile memory 12 (e.g., specified in first system information) through the non-volatile memory IF section 106. The second system information is information previously written to the non-volatile memory 12 at the time of the manufacturing of the non-volatile memory device 1 and then updated when the non-volatile storage device 1 is used, and includes various types of control information in the non-volatile storage device 1. For example, the second system information includes the information related to the conversion table of the logical address and the physical address, the information related to the address of the latecoming defective block, the information related to the number of write times and the number of erase times of the block, the information related to the address of the free block, and the information related to the parity table. When an error occurs in the reading of the second system information, the error correction by the first and/or second error correcting code is carried out.

Next, the process in step S304 will be described. The address management unit 112 generates in the RAM 102 the table information required for address management, according to the content of the read second system information.

Next, the process in step S305 will be described. When an error exceeding a predetermined amount (correctable with first or second error correcting code) occurs in the reading from the non-volatile memory 12 in step S302 and step S303, the process proceeds to the process of step S306. If not, the process proceeds to the process of step S307.

Next, the process in step S306 will be described. The code processing unit 113 generates the first and second error correcting codes with respect to the data of an area where the error exceeding a predetermined amount occurred in the reading from the non-volatile memory 12 in step S302 and step S303. The non-volatile memory control unit 114 then rewrites the data and the generated first and second error correcting codes to the non-volatile memory 12 as new first or second system information.

Next, the process in step S307 will be described. The command processing unit 111 notifies the access device through the access device IF section 104 that the initialization process of the non-volatile storage device 1 is completed, and terminates the initialization process.

1.4 Conclusion

The non-volatile storage device 1 according to the present embodiment is a non-volatile storage device that can communicate with the access device 2, and that carries out reading and/or writing of data in accordance with a command from the access device 2. The non-volatile storage device 1 includes one or more non-volatile memories for storing data, and a memory controller 11 for carrying out the control of the non-volatile memory 12. The non-volatile memory 12 includes the plurality of blocks 121, which are erase units, and the block 121 includes the plurality of pages 122, which are write units of data. The memory controller 11 assigns a plurality of error correcting groups each configured by the plurality of pages 122 to one region of the non-volatile memory 12, assigns data of a predetermined size and an error correcting code with respect to the data of the predetermined size to the error correcting group, and further assigns a parity table to another region of the non-volatile memory 12, and if the data size is smaller than the predetermined size when writing the data, the data is written to the error correcting group and the provisional error correcting code with respect to the relevant data is written to the parity table.

As described above, in the non-volatile storage device 1, the second error correcting code is also stored in addition to the first error correcting code stored in the same page as the data. When writing the data, the first and second error correcting codes are given to the data and then written. When reading the data, the error correction is carried out using the first and/or second error correcting code given to the data.

As a result, in the present embodiment, even if an error beyond the correction capability of the first error correcting code given to the data page occurs in the reading of the data page, the other data page and parity page configuring the parity group can be read and the information of the data page can be restored using the parity page (second error correcting code).

Furthermore, when the access device 2 carries out the writing to the non-volatile storage device 1 at a size smaller than the parity group, only the data page of one part configuring the parity group is updated, and the provisional parity value with respect to the data of the data page of the part is written as the parity page in the parity table region 126, which is a region different from the parity page of the parity group. As a result, the number of pages written to the non-volatile memory 12 during the writing of the size smaller than the parity group can be reduced, and efficient writing can be realized.

The values described in the above embodiment are merely an example, and other values may be used. For example, the values of the respective number of pages in the data page and the parity page configuring the parity group are all merely an example, and the present invention is not limited to the values described in the above embodiment.

Other Embodiments

The present invention has been described based on the above embodiments, but the present invention is, of course, not limited to only the above embodiments, and the embodiment can be changed within a scope not deviating from the technical concept of the invention. Changes can be made as below.

(1) In a diagram showing an example of states during the writing process to the data recording region 125 and to the parity table in the parity table region 126 shown in FIG. 11, assumption is made that there is one logical block. The technical idea of the present invention may, of course, be applied to a case in which a plurality of logical blocks are set.

Figure 14:
FIG. 14 is a diagram showing an example of a parity table according to an embodiment of the present invention in the case where a plurality of logical blocks for storing a parity group are provided.

FIG. 14 is a diagram showing an example of a parity table according to an embodiment of the present invention when a plurality of logical blocks are set. Each record of the parity table includes the parity value (provisional parity value) with respect to the data of one part of the data pages configuring the parity group, the valid flag for determining valid/invalid of the provisional parity value, the identification information of the provisional parity value, and the logical block identification information.

In the example shown in FIG. 14, four logical blocks having "A", "B", "C", "D" as identification information are set. In the respective logical blocks, a new record is stored in the parity table shown in FIG. 14 when the writing of the data page as in the states of T1, T2, T3, T4 shown in FIG. 11 occurs.

(2) In the access device 2, the non-volatile storage device 1, the memory controller 11, and the non-volatile storage system 1000 of the embodiment described above, each function block may be individually formed to one chip by a semiconductor device such as an LSI, or may be formed to one chip so as to include part of or all of the function blocks.

In the above description, the LSI has been provided by way of example, but the function block may be formed to a chip by a semiconductor device such as IC (Integrated Circuit), system LSI, super LSI, ultra LSI, or the like due to the difference in degree of integration.

Moreover, the method of forming an integrated circuit is not limited to the LSI, and an integrated circuit may be realized with a dedicated circuit or a general-purpose processor. Furthermore, an FPGA (Field Programmable Gate Array) capable of being programmed after the LSI manufacturing, or a reconfigurable processor capable of reconfiguring the connection and the setting of the circuit cells in the LSI may be used.

Further, if a technique of forming an integrated circuit that replaces the LSI appears according to a different technique advanced or derived from the semiconductor technique, the integration of the function blocks may, of course, be carried out using such a technique. For example, biotechnology or the like may be applied.

(3) Each process in the embodiment described above may be implemented by hardware, or may be implemented by software (including cases of being realized with OS (operating system), middleware, or predetermined library). Furthermore, each process may be realized by a mixed process of software and hardware. It should be recognized that the timing adjustment for carrying out each process needs to be carried out when implementing the access device 2, the non-volatile storage device 1, and the non-volatile storage system 1000 according to the above-described embodiment by hardware. In the above-described embodiment, the details of the timing adjustment of various types of signals generated in the actual hardware design are omitted for the sake of convenience of explanation.

Moreover, the executing order of the processing method in the embodiment described above is not necessarily limited to the described content of the embodiment described above, and the executing order can be interchanged within a scope not deviating from the technical scope of the present invention.

(4) The non-volatile storage device 1 according to the above embodiment has been described as a detachable storage device like a semiconductor memory card, but may be realized as an information storage module of a type that can be incorporated in a substrate of the access device 2.

The non-volatile storage device and the memory controller according to the present invention can efficiently carry out writing of data of a small size while improving reliability of stored data by carrying out first and second error corrections. This is obviously useful in the semiconductor memory card, but also in a movie, digital still camera, portable telephone terminal and the like, which are information processing terminals incorporating the non-volatile memory, and can be used in the field related to semiconductor memories.

What is claimed is:

1. A non-volatile storage device, which communicates with an access device and carries out reading and/or writing of data in accordance with a command from the access device, the device comprising:
   one or more non-volatile memories for storing data; and
   a memory controller for carrying out control of the non-volatile memory; wherein the non-volatile memory includes
   a plurality of blocks, which are erase units, each of the blocks including a plurality of pages, which are write units of data; and
   the memory controller,
      assigns a plurality of error correcting groups each configured by the plurality of pages to one recording region of the non-volatile memory, and assigns data of a first size and an error correcting code with respect to the data of the first size to the error correcting group,
      further assigns a parity table to a different recording region of the non-volatile memory, the different recording region being different from the one recording region to which the plurality of error correcting groups are assigned,
      and writes data to the error correcting group and writes a provisional error correcting code with respect to the data to the parity table if a data size is smaller than the first size when writing the data,
      wherein when a plurality of parity tables each identical to the parity table are stored, the memory controller sets a most recently stored parity table as valid and sets the other of the plurality of parity tables other than the most recently stored parity table as invalid.

2. The non-volatile storage device according to claim 1, wherein the memory controller updates or deletes the provisional error correcting code stored in the parity table at timings of additionally writing the data in the error correcting group.

3. A memory controller for carrying out control of one or more non-volatile memories for storing data, wherein
   the non-volatile memory includes
   a plurality of blocks, which are erase units, each of the blocks including a plurality of pages, which are write units of data; and
   the memory controller comprises a processor, and using the processor, the memory controller:
      assigns a plurality of error correcting groups each configured by the plurality of pages to one recording region of the non-volatile memory, and assigns data of a first size and an error correcting code with respect to the data of the first size to the error correcting group,
      assigns a parity table to a different recording region of the non-volatile memory, the different recording region being different from the one recording region to which the plurality of error correcting groups are assigned, and
      writes data to the error correcting group and writes a provisional error correcting code with respect to the data to the parity table if a data size is smaller than the first size when writing the data,
      wherein when a plurality of parity tables each identical to the parity table are stored, the memory controller sets a most recently stored parity table as valid and sets the other of the plurality of parity tables handles the parity table other than the most recently stored parity table as invalid.

4. The memory controller according to claim 3, wherein the memory controller updates or deletes the provisional error correcting code stored in the parity table at timings of additionally writing the data in the error correcting group.

* * * * *